(12) United States Patent
Deng et al.

(10) Patent No.: US 10,400,058 B2
(45) Date of Patent: Sep. 3, 2019

(54) DEGRADABLE RESIN COMPOSITION, AND PREPREG, LAMINATE AND COPPER CLAD LAMINATE USING SAME, AND DEGRADING METHOD THEREOF

(71) Applicant: SHENGYI TECHNOLOGY CO., LTD., Guangdong (CN)

(72) Inventors: Huayang Deng, Guangdong (CN); Zengbiao Huang, Guangdong (CN); Qianfa Liu, Guangdong (CN); Zhongqiang Yang, Guangdong (CN); Peng Wang, Guangdong (CN)

(73) Assignee: SHENGYI TECHNOLOGY CO., LTD. (CN)

( * ) Notice: Subject to any disclaimer, the term of this patent is extended or adjusted under 35 U.S.C. 154(b) by 31 days.

(21) Appl. No.: 15/534,557

(22) PCT Filed: May 27, 2015

(86) PCT No.: PCT/CN2015/079967
§ 371 (c)(1),
(2) Date: Jun. 9, 2017

(87) PCT Pub. No.: WO2016/090857
PCT Pub. Date: Jun. 16, 2016

(65) Prior Publication Data
US 2017/0321001 A1 Nov. 9, 2017

(30) Foreign Application Priority Data

Dec. 11, 2014 (CN) .......................... 2014 1 0765220

(51) Int. Cl.
| | | |
|---|---|---|
| *C08G 59/66* | (2006.01) | |
| *B32B 15/092* | (2006.01) | |
| *C08J 5/24* | (2006.01) | |
| *C08G 59/56* | (2006.01) | |
| *C08L 63/00* | (2006.01) | |
| *C08G 59/24* | (2006.01) | |
| *C08G 59/50* | (2006.01) | |
| *C08J 5/04* | (2006.01) | |
| *C08J 11/04* | (2006.01) | |
| *C08K 3/36* | (2006.01) | |
| *C08J 3/24* | (2006.01) | |
| *C08J 11/16* | (2006.01) | |
| *C08J 11/18* | (2006.01) | |

(52) U.S. Cl.
CPC ............ *C08G 59/66* (2013.01); *B32B 15/092* (2013.01); *C08G 59/245* (2013.01); *C08G 59/504* (2013.01); *C08G 59/56* (2013.01); *C08J 3/243* (2013.01); *C08J 5/043* (2013.01); *C08J 5/24* (2013.01); *C08J 11/04* (2013.01); *C08K 3/36* (2013.01); *C08L 63/00* (2013.01); *C08J 11/16* (2013.01); *C08J 11/18* (2013.01); *C08J 2363/00* (2013.01); *C08J 2363/02* (2013.01); *Y02W 30/705* (2015.05); *Y02W 30/706* (2015.05)

(58) Field of Classification Search
CPC ...... C08G 59/66; C08G 59/56; C08G 59/245; C08G 59/504; B32B 15/092; C08J 5/24; C08J 5/043; C08J 11/04; C08J 3/243; C08J 11/16; C08J 11/18; C08J 2363/02; C08J 2363/00; C08L 63/00; C08K 3/36; Y02W 30/705; Y02W 30/706
USPC .......................................................... 528/88
See application file for complete search history.

(56) References Cited

U.S. PATENT DOCUMENTS

| | | | |
|---|---|---|---|
| 5,214,098 A | 5/1993 | Setiabudi et al. | |
| 5,932,682 A * | 8/1999 | Buchwalter ............ | C08G 59/22 525/504 |
| 2004/0101689 A1* | 5/2004 | Valette .................... | B32B 27/04 428/413 |
| 2013/0245204 A1* | 9/2013 | Pastine ................ | C07D 295/13 525/409 |

FOREIGN PATENT DOCUMENTS

| | | |
|---|---|---|
| CN | 1483754 A | 3/2004 |
| CN | 101519505 A | 9/2009 |
| CN | 103012747 A | 4/2013 |

(Continued)

OTHER PUBLICATIONS

Patent Cooperation Treaty (PCT), International Search Report and Written Opinion for Application PCT/CN2015/079967 filed May 27, 2015 dated Sep. 11, 2015 International Searching Authority, CN.

*Primary Examiner* — David T Karst
(74) *Attorney, Agent, or Firm* — McDonald Hopkins LLC

(57) ABSTRACT

Disclosed are a resin composition, and prepreg, laminate and copper clad laminate using the same, and degrading method thereof, the resin composition comprising: an epoxy resin, a degradable amine curing agent, a degradable mercaptan curing agent and an inorganic filler. A copper clad laminate manufactured by the resin composition comprises several pieces of stacked prepreg, and copper foil arranged at one side or two sides of stacked prepreg, each of the prepreg comprising a reinforced material and the resin composition adhered thereon after soaking and drying. The present invention mixes the degradable amine curing agent and the degradable mercaptan curing agent to obtain a curing system having an adjustable reaction rate, thus facilitating process control when manufacturing the copper clad laminate, and the manufactured copper clad laminate has high overall performance and is completely degradable, thus recycling and reusing each of the effective components.

9 Claims, No Drawings

(56) References Cited

FOREIGN PATENT DOCUMENTS

| CN | 103249712 | A | 8/2013 |
| CN | 103450835 | A | 12/2013 |
| CN | 103524784 | A | 1/2014 |
| CN | 104527159 | A | 4/2015 |
| CN | 104530390 | A | 4/2015 |

* cited by examiner

DEGRADABLE RESIN COMPOSITION, AND PREPREG, LAMINATE AND COPPER CLAD LAMINATE USING SAME, AND DEGRADING METHOD THEREOF

CROSS-REFERENCE TO RELATED APPLICATION

This application is a 35 U.S.C. 371 national stage filing of PCT Application No. PCT/CN2015/079967, filed on May 27, 2015, which claims priority to Chinese Patent Application No. 201410765220.3, filed on Dec. 11, 2014 each of which are incorporated herein in their entirety by reference.

TECHNICAL FIELD

The present invention relates to a resin composition, especially a degradable resin to composition, and a prepreg, a laminate, a copper clad laminate and a process for degrading the same.

BACKGROUND ART

Copper clad laminate (CCL) is a raw material for printed circuit board (PCB) which is the basis of the electronic industry and an indispensable important component for all kinds of electronic products. With the upgrading and replacement of electronic products, more and more PCBs are abandoned, and the harmful ingredients in these waste PCBs can pass into the environment through water, atmosphere, soil in natural conditions, causing potential, long-term harm to the environment. Moreover, these hazards are irreversible. Therefore, the waste PCBs must be recycled scientifically and reasonably. Recovery of waste PCBs has gradually become an emerging industry.

At present, the recovery of CCLs or PCBs in accordance with the principles can be divided into chemical recovery and physical recovery. The main methods include direct burial, incineration, pickling and cracking, etc. However, all these methods involve release of toxic substances, and easily result in secondary pollution to the environment, e.g. air or soil. Currently, the best international recycling method is the physical method, i.e. smashing first, then separating metal powder from non-metallic powder in a closed system with fan blowing on the basis of different proportions of metal and non-metal. Such method requires more smashes, and even the smashed powder needs to reach the micron level in order to ensure the separation of metal and non-metal. Moreover, such method has great energy consumption and noise, high equipment requirements and incomplete recovery.

CN1483754 discloses a chemical recovery method for a thermosetting epoxy resin composite material, using a strong nitric acid solution to degrade a thermosetting epoxy resin, which has a great corrosion to the container and a low recovery benefit. CN101519505 discloses a method for separating thermosetting epoxy resin or a composite material thereof by high temperature aqueous phase, which involves catalyzing the degradation of epoxy resin by using a heteropoly acid as a catalyst, and has a great influence on the performances of the recovered product.

Although degradable epoxy curing systems have been reported, the application thereof in CCLs has not been disclosed.

CN103249712A discloses synthetic degradable polyamine or polythiol, which can be used to cure epoxy resins and can be used in the field of carbon fiber composite materials. However, related compounding is needed if being applied to the field of CCLs. Degradable polyamine in the patent has a low curing activity. Curing accelerators, such as imidazoles, cannot be added in order not to affect its degradation performance, thereby leading to too long gelation time of the gel and being disadvantageous of the process control and curing of CCLs. Degradable polythiol has high curing activity, poor latency, and is not conducive to the application in the CCLs.

DISCLOSURE OF THE INVENTION

As to the problems in the prior art, the present invention aims to provide a degradable resin composition, and a prepreg, a laminate and a copper clad laminate using the same. The present invention discloses, by reasonably compounding degradable amine curing agent and degradable thiol curing agent having different activities, effectively controlling the reaction activity of the resin composition without any addition of curing accelerators, making it adaptive to the manufacture process of CCLs to produce degradable CCLs having excellent comprehensive performances.

In order to achieve the above-mentioned object, the present invention discloses the following technical solutions.

The present invention discloses a degradable resin composition, comprising an epoxy resin, a degradable amine curing agent, a degradable thiol curing agent, and an inorganic filler, wherein the degradable amine curing agent has the following structure:

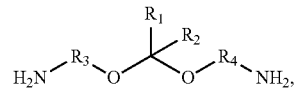

the degradable thiol curing agent has the following structure:

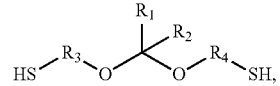

wherein $R_1$ and $R_2$ are independently anyone selected from the group consisting of hydrogen atom, alkyl group, cycloalkyl group, heterocyclic group, heterocycloalkyl group, alkenyl group, cycloalkenyl group, aromatic group, heteroaromatic group, alkyl heteroalkyl group, alkynyl group, alkylene group, alkylene heteroalkylene, alkenylene group, alkylene heteroalkenylene, alkynylene group or alkylene heteroalkynylene;

$R_1$ and $R_2$ may be identical or different;

$R_1$ and $R_2$ may be in the same ring structure together with the adjacent carbon atoms, or may not be in the same ring structure;

$R_3$ and $R_4$ are independently anyone selected from the group consisting of alkylene group, alkylene heteroalkylene, alkenylene group, alkenylene heteroalkenylene, alkylene heteroalkenylene, alkynylene group, cycloalkylene group, alkylene cycloalkylene, alkylene cycloalkylene alkylene, alkenylene cycloalkylene, alkenylene cycloalkylene alkenylene, alkylene cycloalkylene alkenylene, alkynylene cycloalkylene, alkynylene cycloalkylene alkynylene, heterocycloalkylene group, alkylene heterocycloalkylene, alkylene heterocycloalkyl alkylene, alkenylene heterocycloalkylene, alkenylene heterocycloalkyl alkenylene, alkylene heterocycloalkyl alkenylene, alkynylene heterocycloalkylene, alkynylene heterocycloalkyl alkynylene, cycloalkenylene, alkylene cycloalkenylene, alkylene cycloalkenylene alkylene, alkenylene cycloalkenylene, alkenylene cycloalkenylene alkenylene, alkylene cycloalkenylene alkenylene, alkynylene cycloalkenylene, alkynylene cycloalkenylene alkynylene, heterocycloalkenylene, alkylene heterocycloalkenylene, alkylene heterocycloalkenyl alkylene, alkenylene heterocycloalkenylene, alkenylene heterocycloalkenyl alkenylene, alkylene heterocycloalkenyl alkenylene, alkynylene heterocycloalkenylene, alkynylene heterocycloalkenyl alkynylene, arylene group, alkylene arylene group, alkylene arylene alkylene, alkenylene arylene group, alkenylene arylene alkenylene, alkylene arylene alkenylene, alkynylene arylene group, alkynylene arylene alkynylene, heteroarylene group, alkylene heteroarylene group, alkylene heteroarylene alkylene, alkenylene heteroarylene group, alkenylene heteroarylene alkenylene, alkylene heteroarylene alkenylene, alkynylene heteroarylene group, alkynylene heteroarylene alkynylene, 1,4-alkyl substituted piperazine, carbonyl group and thiocarbonyl group;

R₃ and R₄ may be identical or different.

Preferably, the epoxy resin is anyone selected from the group consisting of bisphenol A type epoxy resin, bisphenol F type epoxy resin, bisphenol S type epoxy resin, biphenyl type epoxy resin, isocyanate modified epoxy resin, o-cresol type epoxy resin, naphthalene type epoxy resin, alicyclic epoxy resin, resorcinol type epoxy resin, polyethylene glycol type epoxy resin, trifunctional epoxy resin, tetrafunctional epoxy resin, dicyclopentadiene type epoxy resin and phenolic type epoxy resin, or a mixture of at least two selected therefrom.

Preferably, the inorganic filler is anyone selected from the group consisting of silica, alumina, magnesium oxide, aluminum hydroxide, magnesium hydroxide, boehmite, aluminum nitride, boron nitride, silicon carbide, titanium dioxide, kaolin, calcium carbonate and talc powder, or a mixture of at least two selected therefrom.

Preferably, as to the epoxy resin and the degradable curing agent, the epoxy groups in the epoxy resin and the active hydrogen in the degradable amine and thiol curing agents have a molar ratio of 0.8-1.2, e.g. 0.83, 0.86, 0.89, 0.92, 0.95, 0.98, 1.01, 1.04, 1.07, 1.10, 1.13, 1.16 or 1.19; the active hydrogen in the degradable amine curing agent and the active hydrogen in the degradable thiol curing agent have a molar ratio of 0.5-4.0, e.g. 0.9, 1.3, 1.7, 2.1, 2.5, 2.9, 3.3, 3.7 or 3.9, further preferably 1.0-2.0.

Preferably, the degradable amine curing agent is

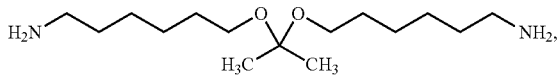

the degradable thiol curing agent is

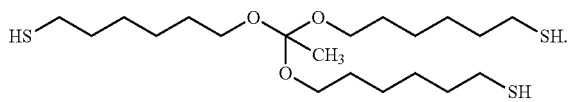 [SMILES: CC(OCCCCCCS)(OCCCCCCS)OCCCCCCS]

Based on 100 parts by weight of the resin composition comprising the inorganic filler, the inorganic filler is added in an amount of 0-30 parts by weight, e.g. 4, 8, 12, 16, 20, 24 or 28 parts by weight.

Said expression "comprising/comprise(s)" means that, in addition to the above components, other components may be included, and impart different properties to the resin composition. In addition, the "comprising/comprise(s)" described in the present invention may also be replaced by "is/are" or "consisting/consist(s) of" in a closed manner.

For example, the resin composition may contain various additives. Specific examples thereof include a flame retardant, an antioxidant, a heat stabilizer, an antistatic agent, an ultraviolet absorber, a pigment, a colorant, a lubricant, and the like. These various additives may be used separately or in combination of two or more.

The second object of the present invention is to provide a resin glue obtained by dissolving or dispersing the resin composition as described above in a solvent.

The solvent of the present invention is not particularly limited. The specific examples thereof include alcohols such as methanol, ethanol and butanol, ethers such as ethyl cellosolve, butyl cellosolve, ethylene glycol-methyl ether, carbitol and butyl carbitol, ketones such as acetone, butanone, methyl ethyl ketone, methyl isobutyl ketone and cyclohexanone, aromatic hydrocarbons such as toluene, xylene and mesitylene, esters such as ethoxyethyl acetate and ethyl acetate, as well as nitrogen-containing solvents such as N, N-dimethylformamide, N, N-dimethylacetamide and N-methyl-2-pyrrolidone. The above-mentioned solvents may be used alone or in combination of two or more. Preferably, aromatic hydrocarbon solvents such as toluene, xylene and mesitylene are used in combination with ketones such as acetone, butanone, methyl ethyl ketone, methyl isobutyl ketone and cyclohexanone.

The third object of the present invention is to provide a prepreg, which comprises a reinforcing material and the resin composition above attached thereon after impregnation and drying.

The fourth object of the present invention is to provide a laminate comprising at least one prepreg above.

The fifth object of the present invention is to provide a copper clad laminate, which comprises at least one laminated prepreg above and copper foil pressed onto one or both sides of said laminated prepreg.

The illustrative process for making the copper clad laminate comprises: dissolving the resin composition with a solvent, impregnating a glass fiber, baking to prepare a prepreg, laminating the prepreg with copper foil, to obtain an epoxy glass fiber-based copper clad laminate.

The sixth object of the present invention is to provide a process for degrading the copper clad laminate, comprising the following steps:

(1) etching copper foil from the copper foil laminate to obtain a copper recovery solution;
(2) placing the core plate from which the copper foil is etched into an organic solvent, adjusting the pH to 4-6 with hydrochloric acid, holding at 100-140° C. for 2-4 h to completely degrade the resin to obtain a reinforcing material and a degradation solution, filtering and separating the degradation solution to obtain an inorganic filler and a resin solution;
(3) adjusting the pH of the resin solution to 6-8 with sodium hydroxide or potassium hydroxide, precipitating the resin, filtering, drying to obtain a linear resin.

The linear resin is a two-dimensional linear resin formed after the chains of three-dimensional reticulated epoxy cured products are broken.

The efficient and green recovery of the effective components in the copper-clad laminate is achieved by the above-described method.

As compared with the prior art, the present invention has the following beneficial effects.

The present invention discloses reasonably compounding the degradable amine curing agent and the degradable thiol curing agent having different activities, so as to effectively control the reactivity of the resin composition without adding any curing accelerator. Therefore, the resin composition is adaptive to the manufacturing process of CCLs, and can be used for preparing degradable CCLs having excellent comprehensive performances. Further, the present invention realizes green recovery of the CCLs, and the manufacturing process thereof is simple and controllable.

EMBODIMENTS

The technical solutions of the present invention are further explained by the following embodiments.

Example 1

Bisphenol A epoxy resin DER 530, having an epoxy equivalent of 430 g/mol, from DOW CHEMICAL.

Degradable amine curing agent

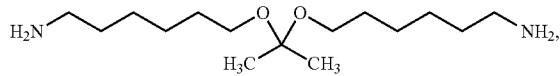 [SMILES: CC(C)(OCCCCCCN)OCCCCCCN]

prepared according to the process disclosed in CN103249712A.

Degradable thiol curing agent

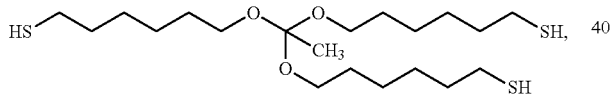

prepared according to the process disclosed in CN103249712A.

Silica powder, DS1032, from LIANYUNGANG DONGHAI SILICON MICROPOWDER CO., LTD

Butanone, Lanzhou Petrochemical Company 125 parts of bisphenol A epoxy resin, 10 parts of degradable amine curing agent, 21 parts of degradable thiol curing agent, 60 parts of silica powder, and 133.3 parts of butanone were mixed to obtain a homogeneously dispersed glue solution. The gelation time (GT) of the glue solution was tested as 225 s. A 2116 glass fiber cloth was impregnated into the composition for sizing, then baked in an oven at 155° C. for 3 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 2

Bisphenol A epoxy resin DER 530, having an epoxy equivalent of 430 g/mol, from DOW CHEMICAL.

Degradable amine curing agent

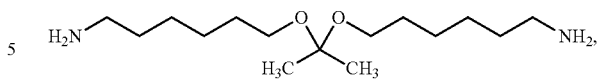

prepared according to the process disclosed in CN103249712A.

Degradable thiol curing agent

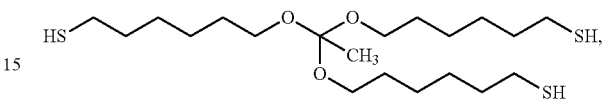

prepared according to the process disclosed in CN103249712A.

Silica powder, DS1032, from LIANYUNGANG DONGHAI SILICON MICROPOWDER CO., LTD

Butanone, Lanzhou Petrochemical Company 125 parts of bisphenol A epoxy resin, 4 parts of degradable amine curing agent, 33 parts of degradable thiol curing agent, 60 parts of silica powder, and 133.3 parts of butanone were mixed to obtain a homogeneously dispersed glue solution. The gelation time (GT) of the glue solution was tested as 105 s. A 2116 glass fiber cloth was impregnated into the composition for sizing, then baked in an oven at 155° C. for 4 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 3

Bisphenol A epoxy resin DER 530, having an epoxy equivalent of 430 g/mol, from DOW CHEMICAL.

Degradable amine curing agent

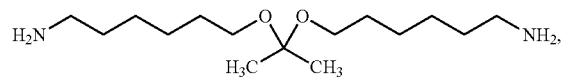 [SMILES: CC(C)(OCCCCCCN)OCCCCCCN]

prepared according to the process disclosed in CN103249712A.

Degradable thiol curing agent

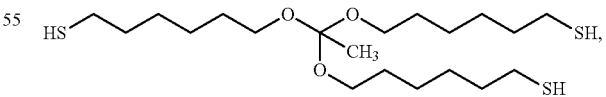

prepared according to the process disclosed in CN103249712A.

Silica powder, DS1032, from LIANYUNGANG DONGHAI SILICON MICROPOWDER CO., LTD

Butanone, Lanzhou Petrochemical Company 125 parts of bisphenol A epoxy resin, 15.9 parts of degradable amine curing agent, 8.2 parts of degradable thiol curing agent, 60 parts of silica powder, and 133.3 parts of butanone were mixed to obtain a homogeneously dispersed glue solution. The gelation time (GT) of the glue solution was tested as 420 s. A 2116 glass fiber cloth was impregnated into the composition for sizing, then baked in an oven at 155° C. for 5 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 4

O-cresol novolac epoxy resin EPON164, having an epoxy equivalent of 225 g/mol, from MOMENTIVE.

Degradable amine curing agent

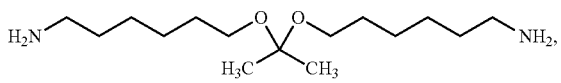

prepared according to the process disclosed in CN103249712A.

Degradable thiol curing agent

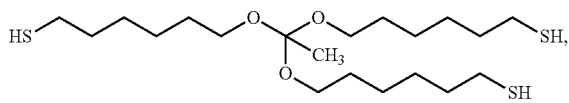 [SMILES: CC(OCCCCCCS)(OCCCCCCS)OCCCCCCS]

prepared according to the process disclosed in CN103249712A.

Silica powder, DS1032, from LIANYUNGANG DONGHAI SILICON MICROPOWDER CO., LTD

Butanone, Lanzhou Petrochemical Company 100 parts of o-cresol novolac epoxy resin, 15.2 parts of degradable amine curing agent, 31.5 parts of degradable thiol curing agent, 60 parts of silica powder, and 133.3 parts of butanone were mixed to obtain a homogeneously dispersed glue solution. The gelation time (GT) of the glue solution was tested as 230 s. A 2116 glass fiber cloth was impregnated into the composition for sizing, then baked in an oven at 155° C. for 8 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 5

Bisphenol A epoxy resin DER 530, having an epoxy equivalent of 430 g/mol, from DOW CHEMICAL.

Degradable amine curing agent

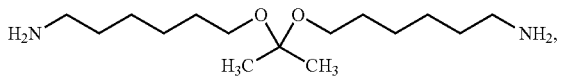

prepared according to the process disclosed in CN103249712A.

Degradable thiol curing agent

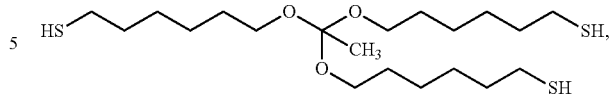

prepared according to the process disclosed in CN103249712A.

Butanone, Lanzhou Petrochemical Company 125 parts of bisphenol A epoxy resin, 10 parts of degradable amine curing agent, 21 parts of degradable thiol curing agent, and 72 parts of butanone were mixed to obtain a homogeneously dispersed glue solution. The gelation time (GT) of the glue solution was tested as 245 s. A 2116 glass fiber cloth was impregnated into the composition for sizing, then baked in an oven at 155° C. for 5 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 6

Bisphenol A epoxy resin DER 530, having an epoxy equivalent of 430 g/mol, from DOW CHEMICAL.

Degradable amine curing agent

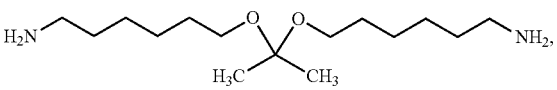 [SMILES: CC(C)(OCCCCCCN)OCCCCCCN]

prepared according to the process disclosed in CN103249712A.

Degradable thiol curing agent

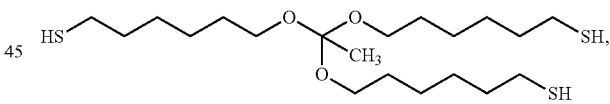

prepared according to the process disclosed in CN103249712A.

Silica powder, DS1032, from LIANYUNGANG DONGHAI SILICON MICROPOWDER CO., LTD

Butanone, Lanzhou Petrochemical Company 125 parts of bisphenol A epoxy resin, 12.4 parts of degradable amine curing agent, 26.1 parts of degradable thiol curing agent, 40 parts of silica powder, and 100 parts of butanone were mixed to obtain a homogeneously dispersed glue solution. The gelation time (GT) of the glue solution was tested as 220 s. A 2116 glass fiber cloth was impregnated into the composition for sizing, then baked in an oven at 155° C. for 5 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 7

Bisphenol A epoxy resin DER 530, having an epoxy equivalent of 430 g/mol, from DOW CHEMICAL.
Degradable amine curing agent

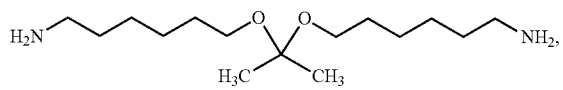

prepared according to the process disclosed in CN103249712A.
Degradable thiol curing agent

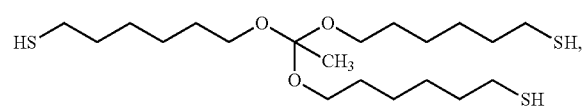 [SMILES: CC(OCCCCCCS)(OCCCCCCS)OCCCCCCS]

prepared according to the process disclosed in CN103249712A.
Silica powder, DS1032, from LIANYUNGANG DONG-HAI SILICON MICROPOWDER CO., LTD
Butanone, Lanzhou Petrochemical Company 125 parts of bisphenol A epoxy resin, 8.3 parts of degradable amine curing agent, 17.4 parts of degradable thiol curing agent, 55 parts of silica powder, and 100 parts of butanone were mixed to obtain a homogeneously dispersed glue solution. The gelation time (GT) of the glue solution was tested as 265 s. A 2116 glass fiber cloth was impregnated into the composition for sizing, then baked in an oven at 155° C. for 5 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 8

Bisphenol A epoxy resin DER 530, having an epoxy equivalent of 430 g/mol, from DOW CHEMICAL.
Degradable amine curing agent

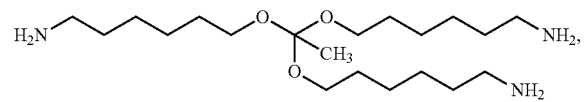

prepared according to the process disclosed in CN103249712A.
Degradable thiol curing agent

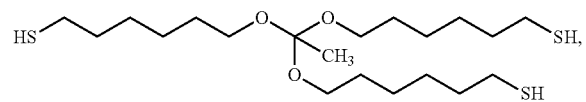 [SMILES: CC(OCCCCCCS)(OCCCCCCS)OCCCCCCS]

prepared according to the process disclosed in CN103249712A.
Silica powder, DS1032, from LIANYUNGANG DONG-HAI SILICON MICROPOWDER CO., LTD
Butanone, Lanzhou Petrochemical Company 125 parts of bisphenol A epoxy resin, 20 parts of degradable amine curing agent, 21 parts of degradable thiol curing agent, 60 parts of silica powder, and 133.3 parts of butanone were mixed to obtain a homogeneously dispersed glue solution. The gelation time (GT) of the glue solution was tested as 330 s. A 2116 glass fiber cloth was impregnated into the composition for sizing, then baked in an oven at 155° C. for 3 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Example 9

Bisphenol A epoxy resin DER 530, having an epoxy equivalent of 430 g/mol, from DOW CHEMICAL.
Degradable amine curing agent

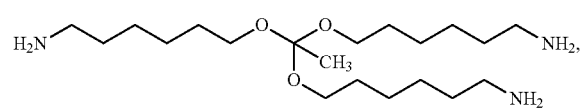

prepared according to the process disclosed in CN103249712A.
Degradable thiol curing agent

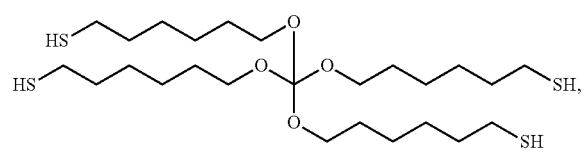 [SMILES: SCCCCCCOC(OCCCCCCS)(OCCCCCCS)OCCCCCCS]

prepared according to the process disclosed in CN103249712A.
Silica powder, DS1032, from LIANYUNGANG DONG-HAI SILICON MICROPOWDER CO., LTD
Butanone, Lanzhou Petrochemical Company 125 parts of bisphenol A epoxy resin, 20 parts of degradable amine curing agent, 26 parts of degradable thiol curing agent, 60 parts of silica powder, and 133.3 parts of butanone were mixed to obtain a homogeneously dispersed glue solution. The gelation time (GT) of the glue solution was tested as 330 s. A 2116 glass fiber cloth was impregnated into the composition for sizing, then baked in an oven at 155° C. for 3 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Comparison Example 1

Bisphenol A epoxy resin DER 530, having an epoxy equivalent of 430 g/mol, from DOW CHEMICAL.

Degradable amine curing agent

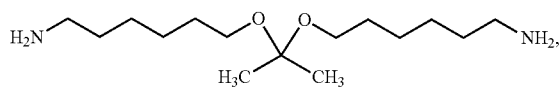 [SMILES: CC(C)(OCCCCCCN)OCCCCCCN]

prepared according to the process disclosed in CN103249712A.

Silica powder, DS1032, from LIANYUNGANG DONGHAI SILICON MICROPOWDER CO., LTD

Butanone, Lanzhou Petrochemical Company 100 parts of bisphenol A epoxy resin, 16 parts of degradable amine curing agent, 60 parts of silica powder, and 133.3 parts of butanone were mixed to obtain a homogeneously dispersed glue solution. The gelation time (GT) of the glue solution was tested as over 1000 s. A 2116 glass fiber cloth was impregnated into the composition for sizing, then baked in an oven at 155° C. for 15 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

Comparison Example 2

Bisphenol A epoxy resin DER 530, having an epoxy equivalent of 430 g/mol, from DOW CHEMICAL.

Degradable thiol curing agent

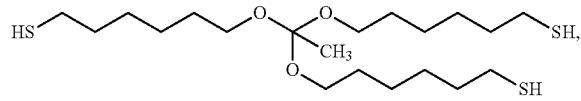

prepared according to the process disclosed in CN103249712A.

Silica powder, DS1032, from LIANYUNGANG DONGHAI SILICON MICROPOWDER CO., LTD

Butanone, Lanzhou Petrochemical Company 100 parts of bisphenol A epoxy resin, 33.4 parts of degradable thiol curing agent, 60 parts of silica powder, and 133.3 parts of butanone were mixed to obtain a homogeneously dispersed glue solution. The gelation time (GT) of the glue solution was tested as 45 s. A 2116 glass fiber cloth was impregnated into the composition for sizing, then baked in an oven at 155° C. for 2 min to prepare a prepreg.

Several prepregs were laminated, covered with electrolytic copper foils having a thickness of 35 μm onto each of the upper and bottom surfaces, hot-pressed in a vacuum press in accordance with an established procedure at 180° C. and 35 kgf/cm² for 90 min to prepare a double-sided copper clad laminate having a thickness of 0.6 mm.

As for the degradation and recovery method of copper clad laminates, the following process was used in Examples 1-4 and Comparative Examples 1-2. Copper foils were etched from the copper foil laminate to obtain a recoverable copper recovery solution. The core plate from which the copper foils were etched was placed into an ethylene glycol solvent, to adjust the pH to 4-6 with hydrochloric acid, hold at 100° C. for 2 h, completely degrade the resin to obtain a glass fiber cloth and a degradation solution. The degradation solution was filtered to obtain a filler. Sodium hydroxide was added dropwise into the remaining degradation solution to adjust the pH thereof to 7, to precipitate the resin composition, filter, dry to obtain a linear resin, so as to achieve the recovery of all components in the copper clad laminates.

As for the copper clad laminates produced above, the glass transition temperature (Tg), peeling strength, interlayer adhesion and dip soldering resistance thereof were measured. The test results are shown in Table 1 and Table 2 below.

TABLE 1

| Test items | Test conditions | Example 1 | Example 2 | Example 3 | Example 4 | Example 5 |
|---|---|---|---|---|---|---|
| Tg(° C.) | DSC | 138 | 125 | 110 | 165 | 139 |
| Peeling Strength (N/mm) | A | 1.46 | 0.90 | 1.25 | 1.35 | 1.51 |
| Interlayer Adhesion (N/mm) | Axe blade method | 0.75 | 0.28 | 0.32 | 0.70 | 0.82 |
| Dip soldering resistance (S) | 288° C. Limit with copper | >300 | 25 | 65 | >300 | >300 |
| Degradability | | Degradable | Degradable | Degradable | Degradable | Degradable |

TABLE 2

| Test items | Test conditions | Example 6 | Example 7 | Example 8 | Example 9 | Comp. Example 1 | Comp. Example 2 |
|---|---|---|---|---|---|---|---|
| Tg(° C.) | DSC | 136 | 132 | 140 | 142 | 95 | 118 |
| Peeling Strength (N/mm) | A | 1.32 | 1.47 | 1.40 | 1.41 | 0.75 | 0.45 |
| Interlayer Adhesion (N/mm) | Axe blade method | 0.73 | 0.81 | 0.71 | 0.70 | 0.12 | 0.1 |
| Dip soldering resistance (S) | 288° C. Limit with copper | 240 | 260 | >300 | >300 | 10 | 5 |
| Degradability | | Degradable | Degradable | Degradable | Degradable | Degradable | Degradable |

The methods for the performance tests above are as follows.

Tg: GBT 19466.2-2004;

Interlayer adhesion: peeling off with a knife 2 layers, about 20 mm, of adhesive sheets from the sample, clamping the sample on the test fixture, fixing the upper and lower ends, so as to make the sample maintain a vertical state, applying a tension force at a rate of 50 mm/min in the vertical direction, separating the same with axe blade for at least 50 mm, reading the data, to obtain the test results.

Dip soldering resistance: GB/T 4722-92;

Peeling strength: Tested by using IPC-TM-650 2.4.8 method;

Degradability: Methods described in Examples and Comparison Examples.

According to the examples and comparison examples, it can be seen that the use of a degradable amine as a curing agent for an epoxy resin alone is detrimental to the process control in the manufacturing process of copper-clad laminates, since it has a low reactivity and a long gelation time; the copper clad laminates have a poor performance. The use of degradable thiol alone as a curing agent for epoxy resin is not conducive to the process control in the manufacturing process of CCLs, due to its high reactivity and too short gelation time; the CCLs obtained have a poor performance. The equivalent ratio of epoxy group to active hydrogen also needs to be controlled within a reasonable range, otherwise it will lead to incomplete curing of CCLs or curing agent residual, thus affecting the performance of CCLs. By reasonably combining degradable amine and thiol curing agents, the reaction activity is moderate, and the process control is simple, so as to prepare CCLs having excellent comprehensive performance and to realize effective and green recovery.

The applicant claims that the present invention describes the detailed process of the present invention, but the present invention is not limited to the detailed process of the present invention. That is to say, it does not mean that the present invention shall be carried out with respect to the above-described detailed process of the present invention. Those skilled in the art shall know that any improvements to the present invention, equivalent replacement of the raw materials of the present invention, addition of auxiliary, selection of any specific ways all fall within the protection scope and disclosure scope of the present invention.

The invention claimed is:

1. A degradable resin composition for copper clad laminates comprising an epoxy resin, a degradable amine curing agent, a degradable thiol curing agent and an inorganic filler, wherein the resin composition does not comprise a curing accelerator, wherein the degradable amine curing agent has the following structure:

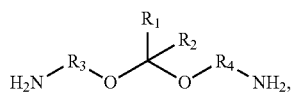

and wherein the degradable thiol curing agent has the following structure:

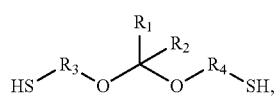

wherein $R_1$ and $R_2$ are independently anyone selected from the group consisting of hydrogen atom, alkyl group, cycloalkyl group, heterocyclic group, heterocycloalkyl group, alkenyl group, cycloalkenyl group, aromatic group, heteroaromatic group, alkyl heteroalkyl group, alkynyl group, alkylene group, alkylene heteroalkylene, alkenylene group, alkylene heteroalkenylene, alkynylene group or alkylene heteroalkynylene, wherein $R_3$ and $R_4$ are independently anyone selected from the group consisting of alkylene group, alkylene heteroalkylene, alkenylene group, alkenylene heteroalkenylene, alkylene heteroalkenylene, alkynylene group, cycloalkylene group, alkylene cycloalkylene, alkylene cycloalkylene alkylene, alkenylene cycloalkylene, alkenylene cycloalkylene alkenylene, alkylene cycloalkylene alkenylene, alkynylene cycloalkylene, alkynylene cycloalkylene alkynylene, heterocycloalkylene group, alkylene heterocycloalkylene, alkylene heterocycloalkyl alkylene, alkenylene heterocycloalkylene, alkenylene heterocycloalkyl alkenylene, alkylene heterocycloalkyl alkenylene, alkynylene heterocycloalkylene, alkynylene heterocycloalkyl alkynylene, cycloalkenylene, alkylene cycloalkenylene, alkylene cycloalkenylene alkylene, alkenylene cycloalkenylene, alkenylene cycloalkenylene alkenylene, alkylene cycloalkenylene alkenylene, alkynylene cycloalkenylene, alkynylene cycloalkenylene alkynylene, heterocycloalkenylene, alkylene heterocycloalkenylene, alkylene heterocycloalkenyl alkylene, alkenylene heterocycloalkenylene, alkenylene heterocycloalkenyl alkenylene, alkylene heterocycloalkenyl alkenylene, alkynylene heterocycloalkenylene, alkynylene heterocycloalkenyl alkynylene, arylene group, alkylene arylene group, alkylene arylene alkylene, alkenylene arylene group, alkenylene arylene alkenylene, alkylene arylene alkenylene, alkynylene arylene group, alkynylene arylene alkynylene, heteroarylene group, alkylene heteroarylene group, alkylene heteroarylene alkylene, alkenylene heteroarylene group, alkenylene heteroarylene alkenylene, alkylene heteroarylene alkenylene, alkynylene heteroarylene group, alkynylene heteroarylene alkynylene, 1,4-alkyl substituted piperazine, carbonyl group and thiocarbonyl group, wherein the epoxy groups in the epoxy resin and the active hydrogen in the degradable amine and thiol curing agents have a molar ratio of 0.8-1.2, and wherein the active hydrogen in the degradable amine curing agent and the active hydrogen in the degradable thiol curing agent have a molar ratio of 0.5-4.0.

2. The resin composition according to claim 1, wherein the epoxy resin is anyone selected from the group consisting of bisphenol A type epoxy resin, bisphenol F type epoxy resin, bisphenol S type epoxy resin, biphenyl type epoxy resin, isocyanate modified epoxy resin, o-cresol type epoxy resin, naphthalene type epoxy resin, alicyclic epoxy resin, resorcinol type epoxy resin, polyethylene glycol type epoxy resin, trifunctional epoxy resin, tetrafunctional epoxy resin, dicyclopentadiene type epoxy resin and phenolic type epoxy resin, or a mixture of at least two selected therefrom.

3. The resin composition according to claim 1, wherein the inorganic filler is anyone selected from the group consisting of silica, alumina, magnesium oxide, aluminum hydroxide, magnesium hydroxide, boehmite, aluminum nitride, boron nitride, silicon carbide, titanium dioxide, kaolin, calcium carbonate and talc powder, or a mixture of at least two selected therefrom.

4. The resin composition according to claim 1, wherein the inorganic filler is added in an amount of 0-30 parts by weight, based on 100 parts by weight of the resin composition comprising the inorganic filler.

5. A prepreg, wherein the prepreg comprises a reinforcing material and the resin composition according to claim 1 attached thereon after impregnation and drying.

6. A laminate, wherein the laminate comprises at least one prepreg according to claim 5.

7. A copper clad laminate, wherein the copper clad laminate comprises at least one prepreg according to claim 5 and copper foil is pressed onto one or both sides of the prepreg.

8. A process for degrading the copper clad laminate claimed in claim 7, the process comprising the following steps:
(1) etching copper foil from the copper foil laminate to obtain a copper recovery solution and a core plate from which the copper foil is etched;
(2) placing the core plate from which the copper foil is etched into an organic solvent, adjusting the pH to 4-6 with hydrochloric acid, holding at 100-140° C. for 2-4 h to completely degrade the resin composition to obtain a reinforcing material and a degradation solution, filtering and separating the degradation solution to obtain an inorganic filler and a resin solution; and
(3) adjusting the pH of the resin composition from the resin solution to 6-8 with sodium hydroxide or potassium hydroxide, precipitating the resin composition, filtering, drying to obtain a linear resin.

9. The resin composition according to claim 1, wherein the degradable amine curing agent is:

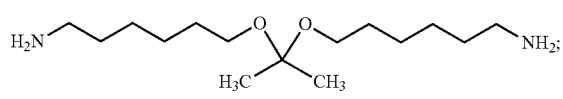 [SMILES: CC(C)(OCCCCCCN)OCCCCCCN]

and
wherein the degradable thiol curing agent is:

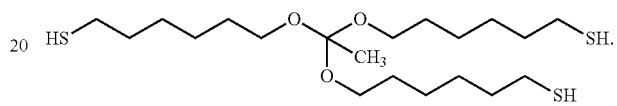

* * * * *